United States Patent
Driscoll et al.

(10) Patent No.: US 8,061,123 B2
(45) Date of Patent: Nov. 22, 2011

(54) METHOD AND SYSTEM OF THERMAL MANAGEMENT IN AN EXHAUST SYSTEM

(75) Inventors: James Joshua Driscoll, Dunlap, IL (US); Michael S. Bond, Chillicothe, IL (US); Michael S. Lukich, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 993 days.

(21) Appl. No.: 11/978,618

(22) Filed: Oct. 30, 2007

(65) Prior Publication Data

US 2009/0107119 A1 Apr. 30, 2009

(51) Int. Cl.
*F01N 3/00* (2006.01)
(52) U.S. Cl. .................. 60/286; 60/274; 60/295; 60/303
(58) Field of Classification Search .................. 60/274, 60/276, 285, 286, 295, 299, 300, 303
See application file for complete search history.

(56) References Cited

U.S. PATENT DOCUMENTS

| | | | |
|---|---|---|---|
| 3,211,788 A | 10/1965 | Cook | |
| 4,480,595 A | 11/1984 | Hobby et al. | |
| 5,116,579 A | 5/1992 | Kobayashi et al. | |
| 5,770,163 A | 6/1998 | Gengo et al. | |
| 5,845,492 A * | 12/1998 | Isobe et al. | 60/284 |
| 5,893,940 A | 4/1999 | Tsai | |
| 6,400,993 B1 | 6/2002 | Oberg | |
| 2005/0013756 A1 | 1/2005 | Amou et al. | |
| 2006/0053775 A1 | 3/2006 | Powell et al. | |
| 2006/0179824 A1 | 8/2006 | Roser | |
| 2007/0036694 A1 | 2/2007 | Nishioka et al. | |
| 2007/0044457 A1 | 3/2007 | Upadhyay et al. | |
| 2007/0110642 A1 | 5/2007 | Hirata | |

FOREIGN PATENT DOCUMENTS

JP 2005-214175 A 8/2005

* cited by examiner

*Primary Examiner* — Thomas E. Denion
*Assistant Examiner* — Diem Tran
(74) *Attorney, Agent, or Firm* — Finnegan, Henderson, Farabow, Garrett & Dunner LLP

(57) ABSTRACT

A method for treating a flow of exhaust from an engine includes injecting reductant into the flow of exhaust with an injector disposed upstream from a catalytic device. The injector and the catalytic device are disposed in an exhaust system for the engine. The method also includes passing the flow of exhaust through the catalytic device, sensing a characteristic of at least one of the exhaust system and the engine, monitoring the sensed characteristic to recognize a condition associated with a formation of a decomposition material formed from the reductant, and controlling an operation of at least one of the engine and the exhaust system to increase a temperature in the exhaust system in response to the recognized condition.

20 Claims, 2 Drawing Sheets

METHOD AND SYSTEM OF THERMAL MANAGEMENT IN AN EXHAUST SYSTEM

TECHNICAL FIELD

The present disclosure relates generally to an exhaust system, and more particularly, to a method and system of thermal management in an exhaust system.

BACKGROUND

Internal combustion engines, including diesel engines, gasoline engines, gaseous fuel-powered engines, and other engines known in the art, may exhaust a complex mixture of air pollutants. The air pollutants may be composed of gaseous and solid compounds, including particulate matter, nitrogen oxides (NOx), and sulfur compounds. Due to heightened environmental concerns, exhaust emission standards have become increasingly stringent. The amount of pollutants emitted from an engine may be regulated depending on the type, size, and/or class of engine.

One method that has been implemented by engine manufacturers to comply with the regulation of NOx exhausted to the environment has been to implement a strategy called selective catalytic reduction (SCR). SCR is a process by which gaseous or liquid reductant (e.g., a mixture of urea and water) is injected into the flow of exhaust from an engine. The combined flow may form ammonia which may then be absorbed onto a catalyst. The ammonia may react with NOx in the flow of exhaust to form $H_2O$ and $N_2$, thereby reducing the amount of NOx in the flow of exhaust.

The ability of urea to form ammonia for reducing NOx at the catalyst depends on the temperature in the exhaust system. At high temperatures (e.g., greater than approximately 200° C.), urea may form ammonia. At low temperatures (e.g., less than approximately 160° C.), urea may be deposited on the pipe walls and may be unable to form ammonia. At moderate temperatures (e.g., approximately 160° C. to 200° C.) and after an extended period of time, urea may be unable to form ammonia and may instead form decomposition materials, such as cyanuric acid, biuret, malamine, and/or other polymeric precursors. These polymeric precursors may react after extended periods of time to form highly stable polymeric materials that may only be removed by physical means, such as a chisel or grinder.

One method of preventing the accumulation of the urea in the exhaust pipe and/or on the catalyst face is described in U.S. Patent Publication No. 2007/0044457 (the '457 publication) to Upadhyay et al. The '457 publication describes an exhaust gas aftertreatment system that includes a catalyst including a housing, SCR catalyst bricks, and an electric heater embedded into the housing. The heater may be activated for a predetermined amount of time to desorb ammonia from the heated region of the catalyst. The temperature of the catalyst may be calculated based on temperature measurements upstream and downstream of the catalyst. To prevent accumulation of the urea in the exhaust pipe and/or on the catalyst face, reductant injection into the catalyst stops when the calculated catalyst temperature is less than a predetermined temperature threshold (170° C.).

Although the system of the '457 publication may prevent the injection of urea when the calculated catalyst temperature is below the predetermined temperature threshold, when the catalyst temperature falls under the predetermined temperature threshold, urea that has already been deposited on the walls of the catalyst may still form the polymeric precursors. These polymeric precursors may form polymeric materials that may only be removed by chisel or grinder, thereby requiring potentially time-consuming and costly maintenance on the catalyst, requiring periodic replacement of the catalyst, and/or decreasing the effectiveness of the catalyst in reducing the amount of NOx in the flow of exhaust.

The disclosed system is directed to overcoming one or more of the problems set forth above.

SUMMARY

In one aspect, the present disclosure is directed to a method for treating a flow of exhaust from an engine. The method includes injecting reductant into the flow of exhaust with an injector disposed upstream from a catalytic device. The injector and the catalytic device are disposed in an exhaust system for the engine. The method also includes passing the flow of exhaust through the catalytic device, sensing a characteristic of at least one of the exhaust system and the engine, monitoring the sensed characteristic to recognize a condition associated with a formation of a decomposition material formed from the reductant, and controlling an operation of at least one of the engine and the exhaust system to increase a temperature in the exhaust system in response to the recognized condition.

In another aspect, the present disclosure is directed to an exhaust system for an engine. The exhaust system includes a catalytic device configured to receive a flow of exhaust and an injector disposed upstream from the catalytic device. The injector is configured to inject reductant into the flow of exhaust. The exhaust system also includes a sensor for sensing a characteristic of at least one of the exhaust system and the engine, and a controller connected to the sensor. The controller is configured to receive the sensed characteristic, determine a rate of formation of a decomposition material formed from the reductant, and control an operation of at least one of the engine and the exhaust system in response to the determination.

In yet another aspect, the present disclosure is directed to a method for treating a flow of exhaust from an engine. The method includes injecting reductant into the flow of exhaust with an injector disposed upstream from a catalytic device. The injector and the catalytic device are disposed in an exhaust system for the engine. The method also includes passing the flow of exhaust through the catalytic device, storing a characteristic of a pipe of the exhaust system near a location where the reductant is injected, sensing a characteristic of at least one of the exhaust system and the engine, and controlling an operation of at least one of the engine and the exhaust system based on the sensed characteristic and the stored characteristic.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
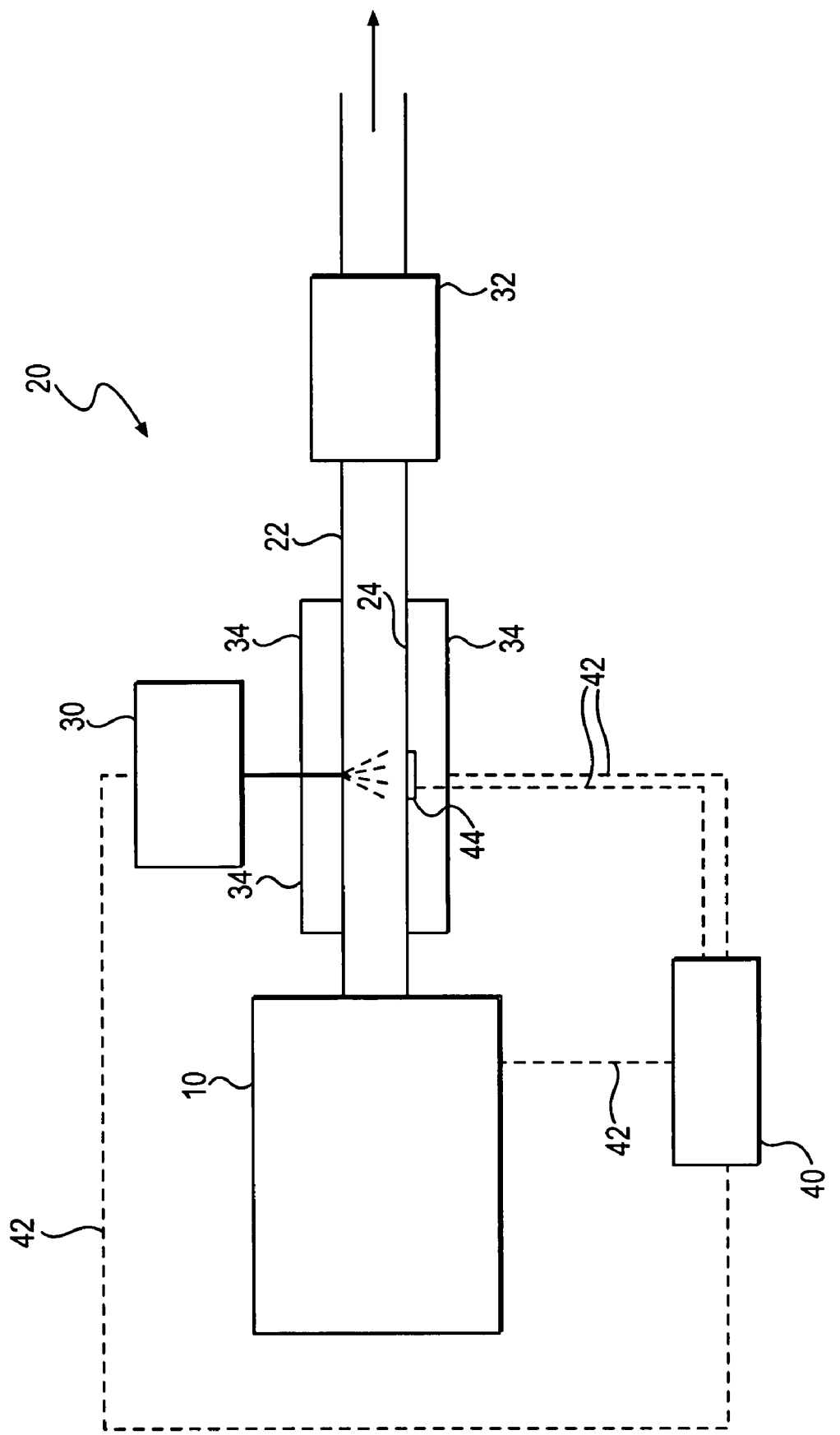
FIG. 1 is a diagrammatic illustration of an exemplary disclosed engine and exhaust system.

As shown in FIG. 1, a power source, such as an engine 10, of a machine is provided. The disclosed embodiment may be applicable to various types of machines such as, for example, a fixed or mobile machine that performs some type of operation associated with an industry such as mining, construction, farming, transportation, power generation, tree harvesting, forestry, or any other industry known in the art. The engine 10 may be an internal combustion engine, such as, for example, a diesel engine, a gasoline engine, a gaseous fuel-powered engine, or any other engine apparent to one skilled in the art. The engine 10 may alternatively be another source of power such as a furnace or any other suitable source of power for a powered system such as a factory or power plant. Operation of the engine 10 may produce power and a flow of exhaust. For example, each combustion chamber (not shown) of the engine 10 may mix fuel with air and combust the mixture therein to produce a flow of exhaust directed into an exhaust passageway. The flow of exhaust may contain carbon monoxide, NOx, carbon dioxide, aldehydes, soot, oxygen, nitrogen, water vapor, and/or hydrocarbons such as hydrogen and methane.

An exhaust system 20 is provided with the engine 10. The flow of exhaust may be fluidly communicated from the engine 10 to the exhaust system 20. Although not shown, other components such as, for example, one or more turbochargers or any other component known in the art for treating or handling exhaust may be disposed between the exhaust passageway of the engine 10 and the inlet of the exhaust system 20. In addition, other emission control devices, e.g., exhaust gas recirculation devices, may be disposed within or fluidly connected to the exhaust passageway of the engine 10.

The flow of exhaust produced by the engine 10 may be directed from the engine 10 to components of the exhaust system 20 by flow lines. For example, as shown in FIG. 1, the flow lines may include pipes, tubing, conduits, and/or other exhaust-carrying structures known in the art. The flow lines may be made of alloys of steel, aluminum, and/or other materials known in the art. The flow lines may be rigid or flexible, and may be capable of safely carrying high temperature exhaust. For example, as shown in FIG. 1, a pipe 22 may be provided as a flow line in the exhaust system 20. The pipe 22 may include one or more walls 24 through which the flow of exhaust may be directed to an injector 30 and a catalytic device, such as an SCR device 32, in the exhaust system 20.

The injector 30 may be disposed upstream from the SCR device 32. The injector 30 may be connected to a reductant supply (not shown) and may inject reductant, such as urea, urea and water, ammonia, and/or other elements or compounds capable of chemically reducing compounds, e.g., NOx, contained within the flow of exhaust in the presence of, for example, catalyst materials. The injector 30 may include a nozzle (not shown) or other flow control device configured to assist in controllably releasing a flow of reductant into the flow of exhaust from the engine 10. The nozzle may be any type of injector known in the art and may include any device capable of injecting and/or atomizing an injected fluid. The nozzle may be configured to substantially evenly distribute the injected fluid within, for example, the pipe 22 or other components of the exhaust system 20 to facilitate a substantially uniform mixing between the injected fluid and the flow of exhaust. The nozzle may also be configured to distribute the injected fluid at a desired angle within the pipe 22 or other components of the exhaust system 20. The timing of the injections by the injector 30 may be synchronized with sensory input received from a sensor, such as a temperature sensor, a NOx sensor, a flow sensor, a pressure sensor, a timer, or any other similar device. It is further contemplated that injections may occur on a set periodic basis, in addition to or regardless of pressure or temperature conditions, if desired.

The SCR device 32 may be an SCR catalyst or other type of catalytic device, and may be disposed downstream of the injector 30. The SCR device 32 may chemically reduce the amount of NOx in the flow of exhaust. Reductant injected into the flow of exhaust by the injector 30 upstream from the SCR device 32 may be absorbed onto the SCR device 32 so that the reductant may react with NOx in the flow of exhaust to form $H_2O$ (water vapor) and $N_2$ (nitrogen gas). For example, a mixture of urea and water injected by the injector 30 may decompose to ammonia, and the SCR device 32 may facilitate a reaction between the ammonia and NOx in the flow of exhaust to produce water and nitrogen gas, thereby removing NOx from the flow of exhaust. After exiting the SCR device 32, the flow of exhaust may be output from the exhaust system 20, e.g., released into the surrounding atmosphere.

In addition to the SCR device 32, the exhaust system 20 may include one or more other aftertreatment devices configured to remove particulates and other pollutants from the flow of exhaust, e.g., a filter for capturing particulates, ash, or other materials from the exhaust gas to prevent their discharge into the surrounding environment, such as a diesel particulate filter (DPF), a system for regenerating the filter by removing the particulate matter trapped by the filter, other catalytic devices (e.g., an additional SCR device) for removing pollutants such as NOx from the exhaust gas by chemical reaction, and/or other exhaust gas treatment devices.

The exhaust system 20 may also include a heater 34, such as an electric heater or any other conventional heat source known in the art. The heater 34 may be positioned so that it surrounds at least a portion of the pipe 22. In an embodiment, the heater 34 is provided so that it surrounds a portion of the pipe 22 near a location where the injector 30 injects the reductant into the flow of exhaust (the reductant injection location). For example, the portion of the pipe 22 surrounded by the heater 34 may span a predetermined distance surrounding the reductant injection location and/or a predetermined distance extending downstream from the reductant injection location. Alternatively, instead of surrounding the pipe 22, the heater 34 may be provided inside the wall 24 of the pipe 22 or at any other location from which the pipe wall 24 is capable of receiving heat.

A controller 40 may be connected via communication lines 42 to one or more of the components of the engine 10 and the exhaust system 20. For example, the controller 40 may receive input via communication lines 42 from a variety of sources including, for example, a timer and/or one or more sensors configured to measure temperature, speed, pressure, fuel quantity consumed, flow rate, amount of reductant injected, and/or other operating characteristics of the engine 10 and/or exhaust system 20. For example, the controller 40 may be connected by a communication line 42 to a sensor 44 configured to sense a characteristic of the exhaust system 20. As shown in FIG. 1, the sensor 44 may be disposed in the pipe wall 24, e.g., near the injection location where the injector 30 injects the reductant into the flow of exhaust. For example, the sensor 44 may be located upstream (e.g., slightly upstream) of the location where the reductant is injected, approximately centered at the location where the reductant is injected (as shown in FIG. 1), or downstream (e.g., slightly downstream) of the location where the reductant is injected. Alternatively, or in addition, the sensor 44 may be disposed in another location in the engine 10 and/or the exhaust system 20. For example, the sensor 44 may be configured to sense an operation characteristic of the engine 10, a temperature of the flow of exhaust, a temperature at another location of the pipe wall 24 and/or the pipe 22, a flow rate of the exhaust, and an amount of reductant injected.

The controller 40 may embody a single microprocessor or multiple microprocessors. Numerous commercially available microprocessors can be configured to perform the functions of the controller 40. The controller 40 may include components required to run an application such as, for example, a memory, a secondary storage device, and a processor, such as a central processing unit or any other means known in the art. The controller 40 may be communicatively coupled with one or more components of the engine 10 and/or the exhaust system 20 to change the operation thereof. Optionally, the controller 40 may be integrated into the engine 10.

The controller 40 may use the inputs to form a control signal based on a pre-set control algorithm. The control signal may be transmitted from the controller 40 via the communication lines 42 to various actuation devices, such as one or more components of the engine 10 and/or the exhaust system 20, e.g., a fuel injector of the engine 10, one or more parasitic loads connected to the engine 10, the injector 30, the heater 34, etc. For example, the controller 40 may transmit a control signal indicating a ratio of air to fuel injected into combustion chambers of the engine 10, an increase in one or more parasitic loads on the engine 10 (e.g., a back pressure valve, a fan, an air compressor, a water pump, an alternator, a generator, belt-driven equipment, an air conditioner, etc., connected to or included in the engine 10), an activation of the heater 34, an increase in an output temperature of the heater 34, etc.

The sensor 44 may embody a physical (hardware) sensor and/or a virtual sensor, which is included in the controller 40, that generates a signal based on a map-driven estimate. The physical sensor may detect and communicate to the controller 40 parameters, e.g., one or more of engine air-fuel ratio settings, engine operating speed, engine load, engine fuel injection profile, other engine operating parameters, exhaust temperature, exhaust flow rate, ambient temperature, a temperature of any element within the exhaust system 20 such as the pipe wall 24 or another location in the pipe 22, etc. The virtual sensor may evaluate the signals received from one or more physical sensors, and, using relationships contained within one or more maps stored in a memory of the controller 40, may estimate an operation characteristic, e.g., the temperature of the pipe wall 24 near the reductant injection location. Alternatively, the sensor 44 may be a physical sensor that is capable of sensing the temperature of the pipe wall 24, e.g., near the reductant injection location.

Figure 2:
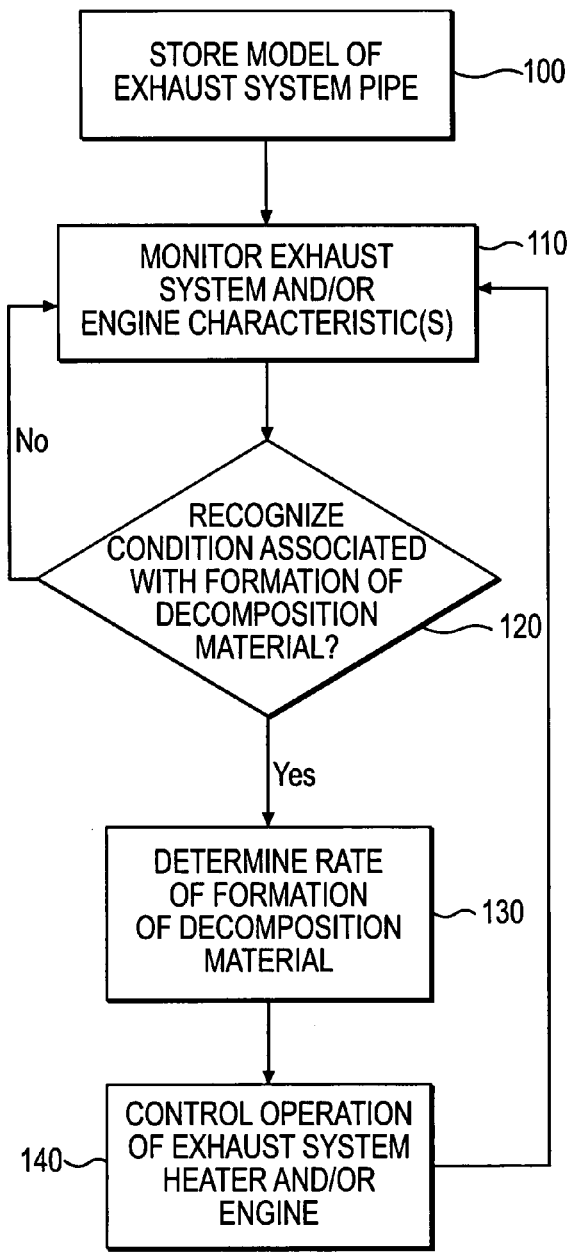
FIG. 2 is a flow chart illustrating an exemplary disclosed method of thermal management in the exhaust system of FIG. 1.

FIG. 2 shows a flow chart depicting an exemplary embodiment of an algorithm of the software control used in connection with the controller 40 shown in FIG. 1. Program control begins at step 100.

In step 100, the controller 40 stores one or more characteristics of one or more pipes 22 of the exhaust system 20. The characteristics may include information indicating, e.g., material characteristics of the pipe 22 (e.g., thermal properties such as thermal conductivity, thermal expansion, other material properties, etc.), structural characteristics of the pipe 22 (e.g., shape, dimensions, features, etc.), etc. In an embodiment, the controller 40 may store the characteristics in the form of a model of the pipe 22. The model may be a single- or multi-dimensional image representing the pipe 22, e.g., including the wall 24 near the reductant injection location. Computer-aided design (CAD) and visualization tools may be used to develop the model. Alternatively, the information provided by such tools may be restricted to textual information and/or limited image data. As an alternative, step 100 may be omitted. Then, control proceeds to step 110.

In step 110, the controller 40 monitors one or more characteristics of the engine 10 and/or the exhaust system 20. For example, as described above in connection with FIG. 1, the controller 40 may receive input from the sensor 44 configured to sense a characteristic of the engine 10 and/or the exhaust system 20. The sensor 44 may be disposed in the wall 24 of the pipe 22, e.g., near the reductant injection location in the exhaust system 20. For example, the sensor 44 may be configured to sense an operation characteristic of the engine 10 (e.g., a temperature of the flow of exhaust output from the engine 10, etc.) or an operation characteristic of the exhaust system 20 (e.g., a temperature of the flow of exhaust at one or more locations in the exhaust system 20, a temperature of the pipe wall 24 or another location in the pipe 22, an ambient temperature, a flow rate of the exhaust, and an amount of reductant injected, etc.). The controller 40 may also monitor time, e.g., a period of time at which the pipe 22 (e.g., the pipe wall 24 near the reductant injection location) is within a predetermined temperature range (e.g., between approximately 160° C. and 200° C.). The controller 40 may monitor the characteristics of the flow of exhaust passing near the reductant injection location and/or the pipe wall 24 near the reductant injection location. Then, control proceeds to step 120.

In step 120, the controller 40 determines if it recognizes a condition associated with a formation of one or more decomposition materials, such as cyanuric acid, biuret, malamine, and/or other polymeric precursors that are capable of forming highly stable polymeric materials. For example, the controller 40 may store one or more trigger conditions. The trigger conditions may be conditions that are associated with a risk of forming decomposition material and/or associated with the actual formation of the decomposition material, i.e., the trigger conditions may be provided to predict and/or diagnose the formation of the decomposition material. The trigger conditions may be determined by experimental data as being conditions that are associated with the formation of or risk of forming decomposition material, and may be determined using the model of the pipe 22 stored in step 100. As the controller 40 monitors the sensed characteristics of the engine 10 and/or the exhaust system 20 in step 110, the controller 40 may determine if any of the stored trigger conditions have occurred. Alternatively, the controller 40 may also use any of the characteristics stored in step 100 to determine whether any of the stored trigger conditions have occurred. An example of a trigger condition includes, e.g., a temperature of the flow of exhaust or of the pipe 22 or pipe wall 24 (e.g., near the reductant injection location in the exhaust system 20) within a predetermined range of temperatures (e.g., moderate temperatures, such as approximately 160° C. to 200° C., 150° C. to 210° C., etc.) at one time or for a predetermined period of time (e.g., approximately one minute, two minutes, four minutes, etc.), a predetermined exhaust flow rate or range of flow rates, a predetermined amount of injected reductant, a predetermined operation of the engine 10, time, and/or any combination thereof.

The temperature of the pipe wall 24 may be determined using the sensor 44, which may include a physical sensor and/or a virtual sensor. In one embodiment, the sensor 44 may be a physical sensor embedded in the pipe wall 24 and configured to measure the temperature of the pipe wall 24. Alternatively, the sensor 44 may include a virtual sensor and one or more physical sensors. The physical sensors may be positioned in various locations in the engine 10 and/or the exhaust system 20 and may sense, for example, the ambient temperature, the temperature of the flow of exhaust, the flow rate of the exhaust, etc. Then, the controller 40 may determine the temperature of the pipe wall 24 (e.g., near the reductant injection location) based on the sensed characteristics using one or more maps. Accordingly, the maps may be used to determine a temperature of the pipe wall 24 (e.g., near the reductant injection location) based on the characteristics sensed by the physical sensors.

In an embodiment, the controller 40 may use the characteristics and/or the model stored in step 100 and the characteristics monitored in step 110 to construct a thermal profile of the pipes 22 of the exhaust system 20. The controller 40 may update the thermal profile in real time, periodically or continuously, during the operation of the engine 10. The thermal profile may be used to determine whether any of the stored conditions described above have occurred. If the controller 40 does not recognize a condition associated with the formation of decomposition material, then control loops back to step 110.

If, in step 120, the controller 40 recognizes the condition associated with the formation of decomposition material, then control continues to step 130. In step 130, the controller 40 determines a rate of formation of the decomposition material based on, for example, one or more stored maps that may be determined from experimental data. The rate of formation of the decomposition material may be determined based on the characteristics and/or the model stored in step 100 and/or the characteristics sensed in step 110. Alternatively, step 130 may be omitted. Control then proceeds to step 140.

In step 140, the controller 40 controls the operation of one or more components of the engine 10 and/or the exhaust system 20, such as the heater 34, in response to recognizing the condition associated with the formation of decomposition material. The controller 40 may control the operation of the engine 10 and/or the exhaust system 20 to increase the temperature of the flow of exhaust passing by the pipe wall 24, e.g., near the reductant injection location. For example, the controller 40 may send control signals to alter the air-fuel ratio in the combustion chambers of the engine 10, to increase the parasitic loads on the engine 10, to activate the heater 34, to increase the output temperature of the heater 34, and/or a combination thereof.

In an embodiment, control may return back to step 110 so that the controller 40 may again monitor the characteristics of the engine 10 and/or the exhaust system 20 (step 110). Then, in step 120, the controller 40 may recognize a condition associated with the formation of decomposition material (step 120). In an embodiment, if the controller 40 recognizes a condition associated with a greater risk of forming the decomposition material (or associated with the formation of more decomposition material) than a previously recognized condition, then in step 140, the controller 40 may control the heater 34 to further increase the temperature of the pipe wall 24 and/or may control the engine 10 to further increase the temperature of the flow of exhaust. Alternatively, if the controller 40 recognizes a condition associated with a lesser risk of forming the decomposition material (or associated with the formation of zero or a minimal amount of decomposition material), then in step 140, the controller 40 may deactivate the heater 34 or control the heater 34 to decrease the temperature of the pipe wall 24, and/or may control the engine 10 to decrease the temperature of the flow of exhaust (e.g., by deactivating and/or decreasing one or more parasitic loads on the engine 10).

Figure 3:
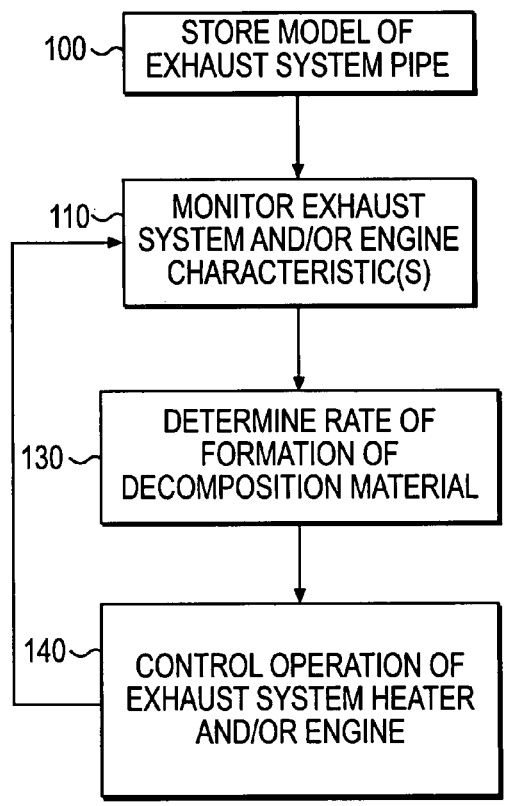
FIG. 3 is a flow chart illustrating another exemplary disclosed method of thermal management in the exhaust system of FIG. 1.

In an alternative, as shown in FIG. 3, the controller 40 may optionally store one or more characteristics of one or more pipes 22 of the exhaust system 20 and may monitor one or more characteristics of the engine 10 and/or the exhaust system 20, as described above in steps 100 and 110. Then, instead of determining whether the controller recognizes a condition associated with the formation of decomposition material, the controller 40 may determine a rate of formation of the decomposition material, as described above in step 130. Then, control proceeds to step 140. As described above, in step 140, the controller 40 controls the operation of one or more components of the engine 10 and/or the exhaust system 20. Then, control may return back to step 110.

The flowcharts described above in connection with FIGS. 2 and 3 depict exemplary embodiments of the algorithm and software control. Those skilled in the art will recognize that similar algorithms and software control may be used without deviating from the scope of the present disclosure.

INDUSTRIAL APPLICABILITY

The disclosed exhaust system may be applicable to any machine that includes an exhaust system. The disclosed exhaust system and method of treating a flow of exhaust from an engine may prevent the build-up of unwanted decomposition material inside the walls of the pipes of the exhaust system while reducing the amount of NOx in the flow of exhaust. As a result, the engine and/or the exhaust system may perform more efficiently, may require less maintenance, and may be less expensive to maintain. The operation of the exhaust system and method of treating a flow of exhaust from an engine will now be explained.

According to the embodiment of the exhaust system 20 shown in FIG. 1, the flow of exhaust may be directed from the engine 10 to the exhaust system 20 and may pass through the pipe 22 of the exhaust system 20. Reductant may be injected into the flow of exhaust by the injector 30 and then the flow of reductant and exhaust may be directed to the SCR device 32 to reduce the amount of NOx in the flow of exhaust.

Before or as the engine 10 is operating, the controller 40 may store the characteristics (e.g., the model) of the pipe 22 of the exhaust system 20 (step 100). As a result, using the characteristics of the pipe 22 for determining the prognosis and/or diagnosis of the formation of the decomposition material in the pipes 22 allows for more accurate results. For example, when the model stores specific material characteristics, such as thermal properties, and structural characteristics of the pipes 22, temperature and other operation characteristics of the pipes 22 may be more accurately determined. The operation characteristics of the pipes 22 may be used to determine one or more of the trigger conditions and/or may be used to determine if a trigger condition has occurred.

As the engine 10 is operating, the controller 40 may predict and/or diagnose the formation of the decomposition material based on the sensed characteristics. As shown in FIG. 2, the formation of the decomposition material may be predicted and/or diagnosed first by monitoring the characteristics (e.g., operation characteristics) of the engine 10 and/or the exhaust system 20 (step 110) and then by determining if any trigger conditions associated with the prediction and/or diagnosis of the formation of the decomposition material are recognized (step 120). For example, a trigger condition may be a predetermined sensed temperature (e.g., within a range of moderate temperatures, e.g., 160° C. to 200° C., etc.) of the flow of exhaust and/or the pipe wall 24 (e.g., near the reductant injection location) either at one time or for a predetermined period of time (e.g., four minutes, etc.). Another example of a trigger condition is a predetermined sensed temperature of the flow of exhaust and/or the pipe wall 24 and a predetermined exhaust flow rate. Yet another example of a trigger condition is a predetermined sensed temperature of the flow of exhaust and/or the pipe wall 24, and a predetermined amount of injected reductant. As a result, based on the sensed characteristics and the stored characteristics (e.g., the model of the pipe wall 24), the controller 40 may determine if there is a risk of formation of the decomposition material and/or if the decomposition material has actually formed. More accurate results may be obtained since real time sensed operation characteristics (and optionally, specific material and structural characteristics of the pipe 22) may be used to make the prognosis and/or diagnosis. With more accurate results regarding whether the trigger condition has been recognized, the controller 40 may recognize the trigger condition more quickly and may take more efficient steps in preventing the formation of the decomposition material.

A physical and/or a virtual sensor 44 may be provided for determining the temperature of the pipe wall 24. The sensor 44 may measure the temperature of the pipe wall 24 directly and/or may determine the temperature of the pipe wall 24 based on, e.g., an outside (ambient) temperature, an exhaust gas temperature, an exhaust gas flow rate, etc. As a result, the temperature of the pipe wall 24 may be determined more accurately, and the type of sensor 44 selected may be determined based on the particular exhaust system 20.

Alternatively, the controller 40 may also determine the rate of formation of the decomposition material (step 130) based on the characteristics of the pipe 22 stored in step 100 and/or the operation characteristics sensed in step 110. In another embodiment, as shown in FIG. 3, instead of recognizing the trigger conditions, the formation of the decomposition material may be predicted and/or diagnosed first by monitoring the characteristics (e.g., operation characteristics) of the engine 10 and/or the exhaust system 20 (step 110) and then by determining the rate of formation of the decomposition material (step 120). As a result, by knowing the rate of formation of the decomposition material, the controller 40 may be able to use the calculated rate of formation to adapt a more efficient and effective way to prevent the formation of the decomposition material.

If the controller 40 predicts and/or diagnoses the formation of decomposition material, then the controller 40 may determine a control signal for controlling the operation of the engine 10 and/or the exhaust system 20. The control signal determined by the controller 40 may depend on the particular trigger condition recognized in step 120 and/or the particular rate of formation determined in step 130. Then, the controller 40 may transmit the control signal to one or more components of the engine 10 and/or the exhaust system 20 (step 140). For example, the controller 40 may activate a heat source to heat the pipe wall 24 (e.g., by controlling the heater 34 for heating the pipe 22, e.g., the portion of the pipe 22 near the reductant injection location). Directly applying heat to the pipe 22, e.g., using the heater 34, may prevent heat loss from the pipe 22, such as when the pipe 22 is not surrounded by the heater 34 and an exterior surface of the pipe 22 is cooled by ambient air. As a result, the pipe wall 24 may be heated more effectively.

Alternatively, or in addition, the controller 40 may modify the operation of the engine 10 to increase the temperature of the exhaust gas. For example, the air-fuel ratio inside the combustion chambers of the engine 10 may be adjusted and/or the parasitic load (e.g., a back pressure valve) on the engine 10 may be controlled to increase the exhaust gas temperature. As a result, the formation of the decomposition material in the pipes 22 of the exhaust system 20 may be prevented while NOx in the flow of exhaust may be reduced.

Thermal management of the pipes 22 is desirable to maintain high temperatures for facilitating the production of ammonia upstream of the SCR device 32 to reduce NOx and to avoid forming unwanted byproducts that are hard to remove and that may build up inside the pipe 22. Also, according to an embodiment, thermal management of the pipes 22 may allow the engine 10 to conserve power, fuel, and/or other resources for heating the exhaust gas and/or the pipe wall 24 until the controller 40 sends a control signal, e.g., when the trigger condition is recognized, based on the calculated rate of formation of the decomposition material, etc.

It will be apparent to those skilled in the art that various modifications and variations can be made to the exhaust system and method of treating a flow of exhaust from an engine. Other embodiments will be apparent to those skilled in the art from consideration of the specification and practice of the disclosed exhaust system and method of treating a flow of exhaust from an engine. It is intended that the specification and examples be considered as exemplary only, with a true scope being indicated by the following claims and their equivalents.

What is claimed is:

1. A method for treating a flow of exhaust from an engine, the method comprising:
    injecting reductant into the flow of exhaust with an injector disposed upstream from a catalytic device, the injector and the catalytic device being disposed in an exhaust system for the engine;
    passing the flow of exhaust through the catalytic device;
    sensing a characteristic of at least one of the exhaust system and the engine, the sensed characteristic including at least one of a temperature of at least one of the flow of exhaust and a wall of a pipe of the exhaust system;
    monitoring the sensed characteristic to predict a formation of a decomposition material formed from the reductant, the formation of the decomposition material being predicted based on a time measurement and the sensed temperature; and
    controlling an operation of at least one of the engine and the exhaust system to increase a temperature in the exhaust system in response to the prediction.

2. The method of claim 1, wherein the sensed characteristic further includes a flow rate of the exhaust and an amount of reductant injected.

3. The method of claim 1, wherein the formation of the decomposition material is predicted based on at least one of the sensed temperature of the pipe of the exhaust system and a calculated temperature of the pipe of the exhaust system.

4. The method of claim 1, wherein the formation of the decomposition material is predicted based on a model of the pipe of the exhaust system near a location where the reductant is injected.

5. The method of claim 1, wherein the sensed temperature is a temperature of the wall of the pipe of the exhaust system near a location where the reductant is injected.

6. The method of claim 1, wherein the at least one of the engine and the exhaust system is controlled when the sensed temperature is above a first predetermined temperature and below a second predetermined temperature for a predetermined amount of time.

7. The method of claim 1, further including determining a rate of formation of the decomposition material, the at least one of the engine and the exhaust system being controlled based on the determined rate of formation of the decomposition material.

8. The method of claim 1, wherein the decomposition material includes a polymeric precursor.

9. The method of claim 1, wherein the controlling of the operation of the at least one of the engine and the exhaust system includes controlling the operation of the engine to increase the temperature of the flow of exhaust.

10. The method of claim 9, wherein the controlling of the operation of the engine to increase the temperature of the flow of exhaust includes at least one of altering an air-fuel ratio of a combustion chamber of the engine and increasing a load on the engine.

11. The method of claim 1, wherein the controlling of the operation of the at least one of the engine and the exhaust system includes controlling a heater of the exhaust system to increase a temperature of the wall of the pipe of the exhaust system near a location where the reductant is injected.

12. The method of claim 11 wherein the controlling of the operation of the at least one of the engine and the exhaust system further includes deactivating the heater based on the sensed characteristic.

13. An exhaust system for an engine, the exhaust system comprising:
  a catalytic device configured to receive a flow of exhaust;
  an injector disposed upstream from the catalytic device, the injector being configured to inject reductant into the flow of exhaust;
  a sensor for sensing a characteristic of at least one of the exhaust system and the engine; and
  a controller connected to the sensor, the controller being configured to receive the sensed characteristic, determine a rate of formation of a decomposition material formed from the reductant, and control an operation of at least one of the engine and the exhaust system in response to the determination.

14. The exhaust system of claim 13, wherein the controller is configured to monitor the sensed characteristic to predict a formation of the decomposition material from the reductant, and control the operation of the at least one of the engine and the exhaust system in response to the prediction.

15. The exhaust system of claim 13, wherein the controller is configured to operate the engine to increase a temperature of the flow of exhaust in response to the determination.

16. The exhaust system of claim 13, further including a heater surrounding a wall of a pipe of the exhaust system near a location where the reductant is injected, the controller being connected to the heater and being configured to control the heater to increase the temperature of the wall of the pipe in response to the determination.

17. The exhaust system of claim 13, further including:
  memory for storing at least one characteristic of a pipe of the exhaust system near a location where the reductant is injected,
  the controller being connected to the memory, and the controller being configured to receive the sensed characteristic and the stored characteristic, and control the operation of the at least one of the engine and the exhaust system based on the sensed characteristic and the stored characteristic, 18. A method for treating a flow of exhaust from an engine, the method comprising:
  injecting reductant into the flow of exhaust with an injector disposed upstream from a catalytic device, the injector and the catalytic device being disposed in an exhaust system for the engine;
  passing the flow of exhaust through the catalytic device;
  storing a characteristic of a pipe of the exhaust system, the pipe being near a location where the reductant is injected;
  sensing a characteristic of at least one of the exhaust system and the engine;
  calculating a temperature of the pipe based on the sensed characteristic and the stored characteristic; and
  controlling an operation of at least one of the engine and the exhaust system based on the calculated temperature.

19. The method of claim 18, wherein the sensed characteristic includes at least one of a temperature of at least one of the flow of exhaust and a wall of a pipe of the exhaust system, a flow rate of the exhaust, and an amount of reductant injection.

20. The method of claim 18, further including determining a rate of formation of a decomposition material formed from the reductant, the at least one of the engine and the exhaust system being controlled based on the determined rate of formation of the decomposition material.

* * * * *